United States Patent [19]

Neitz

[11] Patent Number: 4,742,950
[45] Date of Patent: May 10, 1988

[54] METHOD OF AND ARRANGEMENT FOR SOLDERING ALUMINUM PARTS

[75] Inventor: Günter Neitz, Detmold, Fed. Rep. of Germany

[73] Assignee: Verwaltungsgesellschaft Heinrich Neitz GmbH & Co. KG, Detmold, Fed. Rep. of Germany

[21] Appl. No.: 846,881

[22] Filed: Mar. 31, 1986

[30] Foreign Application Priority Data

Mar. 30, 1985 [DE] Fed. Rep. of Germany ....... 3511854

[51] Int. Cl.$^4$ .................... B23K 31/02; B23K 35/24
[52] U.S. Cl. .................... 228/240; 228/242; 228/102
[58] Field of Search .............. 228/102, 240, 242, 200, 228/201, 202; 364/477, 577

[56] References Cited

U.S. PATENT DOCUMENTS

| | | | |
|---|---|---|---|
| 3,210,838 | 10/1965 | Nast | 228/102 |
| 3,702,692 | 11/1972 | Metzger | 228/242 |
| 3,769,675 | 11/1973 | Chartet | 228/240 |
| 4,327,265 | 4/1982 | Edinger | 228/102 |
| 4,501,552 | 2/1985 | Wakamiya | 364/477 |
| 4,512,327 | 4/1985 | Stiegler | 219/400 |
| 4,609,343 | 9/1986 | Tejfalussy | 364/477 |
| 4,617,638 | 10/1986 | Krause | 364/477 |

Primary Examiner—Kurt Rowan
Attorney, Agent, or Firm—Erwin S. Teltscher

[57] ABSTRACT

An arrangement for soldering aluminum objects which are coated with solder, especially coolers and heat exchangers, comprises at least one oven section and a cooling chamber. A transporting arrangement, especially a carriage, advances the objects to be soldered in succession through the oven section and the cooling chamber. A heating arrangement and a controllable blower are arranged in each of the oven sections provided, being operative for directing heated air against the objects advancing through the respective oven section. A first temperature sensor measures the temperature upstream of the objects as considered in the flow direction of the heated air, while at least one second temperature sensor is arranged at the opposite side of the object from the first sensor and is operative for measuring the temperature of the air that has been discharged from the object after it has intimately contacted and heated the same. An auxiliary radiation heating arrangement may be provided, so that the objects are heated both by convection heat carried by the air flow that has been heated by the heating arrangement, and by radiation heat emanating from the radiation heating arrangement to thereby achieve a uniform temperature increase and thorough heating of the object from both sides.

16 Claims, 9 Drawing Sheets

METHOD OF AND ARRANGEMENT FOR SOLDERING ALUMINUM PARTS

BACKGROUND OF THE INVENTION

The present invention relates to soldering in general, and more particularly to a method of soldering aluminum parts which are coated with solder, especially coolers and heat exchangers, and to an arrangement for performing such a method.

It is already known to heat aluminum parts which are coated with solder in continuous ovens in a plurality of stages performed in respective successive heating zones in which heated air and/or protective gas is moved over and/or through the objects to be soldered. The heating is continued until the solder melts, after which a cooling and cleaning of the soldered object is performed in a last zone. A forced aeration with heated air occurs in the heating zones, the temperature of the heated air being kept as close to the respective desired temperature for the respective heating zone as possible. The aluminum parts are moved either intermittently or continuously through the successive zones.

In this known continuous oven, it is not possible to maintain the temperature in the particularly critical soldering zone free from variations, inasmuch as colder air streams are able to penetrate into the soldering zone through the input and output openings for the objects and, in this manner, there occur temperature intrusions. For this reason, it is also not possible to provide an exact regulation of the temperature in the soldering oven to the melting termination temperature of the respective solder and a short dwell time of the object at this temperature, which is of the highest importance for a high-quality soldering; rather, there must be chosen an increased air temperature and/or an increased soldering time, and an increased air flow velocity must be provided, which under normal circumstances results in a deterioration of the soldering quality.

SUMMARY OF THE INVENTION

Accordingly, it is a general object of the present invention to avoid the disadvantages of the prior art.

More particularly, it is an object of the present invention to provide a method of soldering parts, especially aluminum parts, which method does not possess the disadvantages of the heretofore known methods of this kind.

It is still another object of the present invention to devise a method of the above kind which renders it possible to perform the soldering operation in an economical manner and with the highest quality.

A concomitant object of the present invention is to develop an arrangement which is particularly suited for the performance of the above method.

Yet another object of the present invention is so to construct the arrangement of the above type as to render it possible to accurately control the processing conditions under which the soldering operation is being conducted.

In keeping with these objects and others which will become apparent hereafter, one feature of the present invention resides in a method of soldering objects, especially aluminum objects, which are provided with respective solder layers, particularly coolers, this method comprising the steps of directing a flow of a heated gaseous medium in the course of a soldering operation against the objects to be soldered for the heated gaseous medium to come into intimate heat-transfer contact with the objects and thus to heat the same; detecting the temperature of the gaseous medium discharged after its contact with the objects; controlling the velocity of the heated gaseous medium flow directed against the objects, including maintaining such velocity at a predetermined maximum velocity value when the temperature of the discharged gaseous medium as detected during the detecting step is lower than a predetermined lower limiting temperature, gradually decreasing such velocity from the maximum velocity value to a predetermined minimum velocity value in dependence on the approach of the temperature of the discharged gaseous medium as detected during the detecting step to a predetermined upper limiting temperature, and keeping such velocity at the minimum velocity value when the temperature of the discharged gaseous medium as detected during the detecting step at least equals the upper limiting temperature; and terminating the respective soldering operation in dependence on the reaching of the upper limiting temperature by the discharged gaseous medium. It is especially advantageous when the terminating step includes commencing a predetermined time-delay period for post-soldering treatment of the objects in response to the first detection of the reaching of the upper limiting temperature during the detecting step of the respective soldering operation, and ending the respective soldering operation only after the expiration of the time-delay period.

As a result of the reduction of the gaseous medium velocity when the solder and/or the object has been brought to a predetermined temperature, a lateral flow between the zones of the continuous oven is largely eliminated.

According to another aspect of the present invention, there is provided an arrangement for soldering objects, especially aluminum objects, which are provided with respective solder layers, particularly coolers, comprising at least one oven section and a cooling chamber arranged adjacent to the oven section; means for transporting the objects in succession through the oven section and the cooling chamber; means for directing a flow of a heated gaseous medium against the objects in the oven section for the heated gaseous medium to contact the objects and heat the same, including a heating arrangement and a controllable blower arranged in the oven section; and means for detecting temperatures in the oven section, including a first temperature sensor for detecting the oven temperature upstream of the objects and at least one second temperature sensor for detecting the temperature of the gaseous medium discharged from the objects. Advantageously, the arrangement further comprises respective doors capable of closing the respective ends of the at least one section and the cooling chamber with respect to the exterior and to one another, and means for automatically operating the doors in such a manner as to be open only while the objects are to pass into and out of the respective ends. Such doors fully eliminate the passage of colder air drafts through the soldering zone.

The possibility of a very accurate determination of the constant temperature behavior constitutes a foundation for further advantageous features of the present invention which increase the economy of the soldering arrangement, improve the operational performance and reliability thereof, and render possible a complete automation of the operation of the soldering arrangement.

The following is determined from the temperature behavior in the corresponding zone:

1. The solder melting termination temperature for the determination of the oven temperature in the soldering zone and of the termination of the soldering operation.
2. The solder melting commencement temperature for the determination of the soldering time.
3. The temperature behavior during the preheating time for the determination of the transport time points from one zone to another (phase durations) with a minimization of the total time and for the determination of the input data for the air velocity control.

Advantageously, for increasing the measuring accuracy or the determination of the various points in time, it is resorted to an average value formation over suitable time periods. Furthermore, the process is adjusted automatically and in a stepwise manner to the optimum conditions for each solder, inasmuch as it is begun from the actual solder melting region. The calibration of all temperature sensors with respect to one another and to the respective solder temperature occurs automatically. The different distribution of different objects to be soldered in the soldering arrangement is advantageously taken into consideration by evaluating the signals originating at a plurality of distributed discharged air temperature sensors with respect to one another.

A construction of the heated air guidance system, which is advantageous in this context, involves the provision of an adjustable throttling arrangement which provides a pointedly distributed and aimed air stream and which is preferably automatically adjusted in response to different distributions of the discharged air temperatures which are caused by the aforementioned different distributions of the objects to be soldered.

BRIEF DESCRIPTION OF THE DRAWING

The present invention will now be described in more detail with reference to the accompanying drawing, in which.

DETAILED DESCRIPTION OF THE PREFERRED EMBODIMENT

Figure 7:
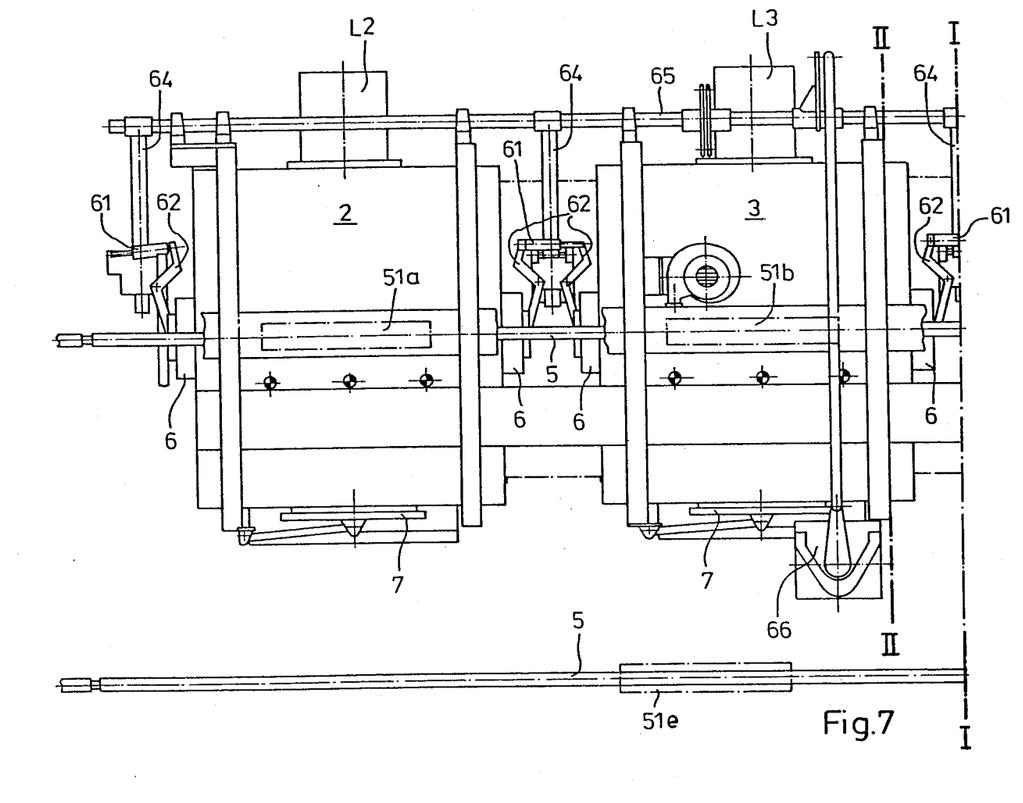
FIG. 7 is a top plan view of the preheating oven and soldering oven of FIG. 6.
Figure 8:
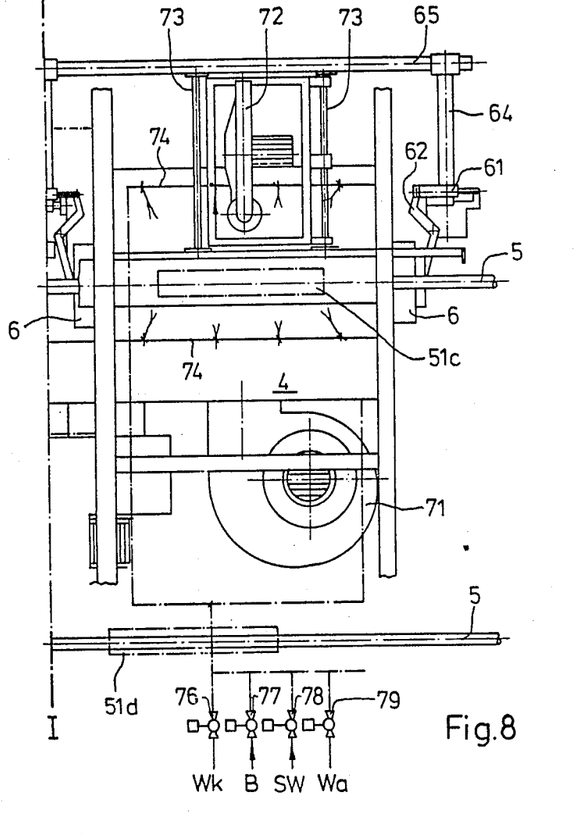
FIG. 8 is a top plan view of a cooling chamber which completes FIG. 7 into a top plan view of the entire soldering arrangement of the present invention.

Referring now to the drawing in detail, and first to FIGS. 7 and 8 thereof, it may be seen that they are separated from one another at a parting line I—I but that, when considered in conjunction with one another, they show a complete top plan view of a soldering arrangement. The soldering arrangement consists of three zones, namely, two oven sections 2 and 3 and a cooling chamber 4. The oven section 2 serves as a preheating oven, while the oven section 3 serves as a soldering oven.

Figure 1:
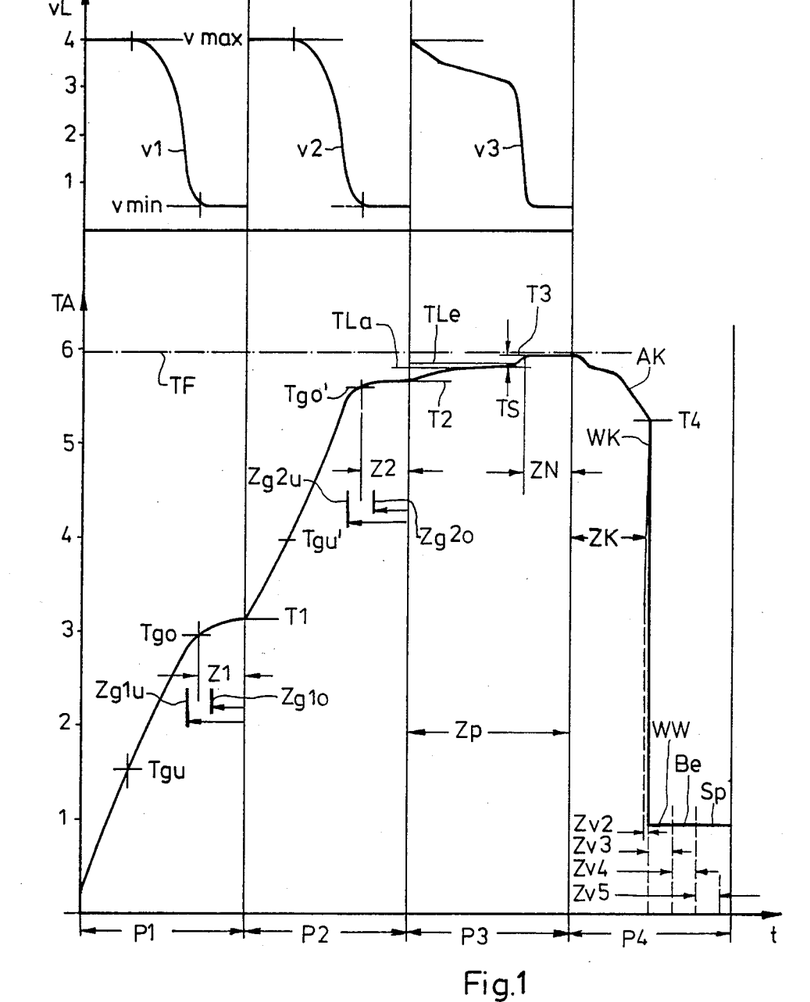
FIG. 1 is a diagrammatic representation of the characteristic behavior curves for the temperature and the air velocity during a complete soldering process conducted in four successive phases.

In a modified construction designed for high throughput, there can be provided an additional initial preheating oven that is arranged upstream of the preheating oven 2; such an amplified arrangement is considered below in connection with the discussion of the method of operating the arrangement in accordance with FIG. 1.

An intermittently and/or continuously operating transport arrangement 5, preferably a conveyor carriage, runs through the entire soldering arrangement. Parts 51a to 51e which are to be soldered are suspended from the transport arrangement 5 by means of respective holding elements. The ovens 2 and 3 and the cooling chamber 4 are respectively closable at both sides by respective doors 6. The doors 6 are held in their closed positions by means of respective fluid-operated cylinder-and-piston units 61 via respective connecting links 62, while they are swung open for the passage of the parts 51a to 51c by means of respective pivoted arms 64 which are controlledly actuated by a shaft 65 driven by a drive 66.

Figure 5:
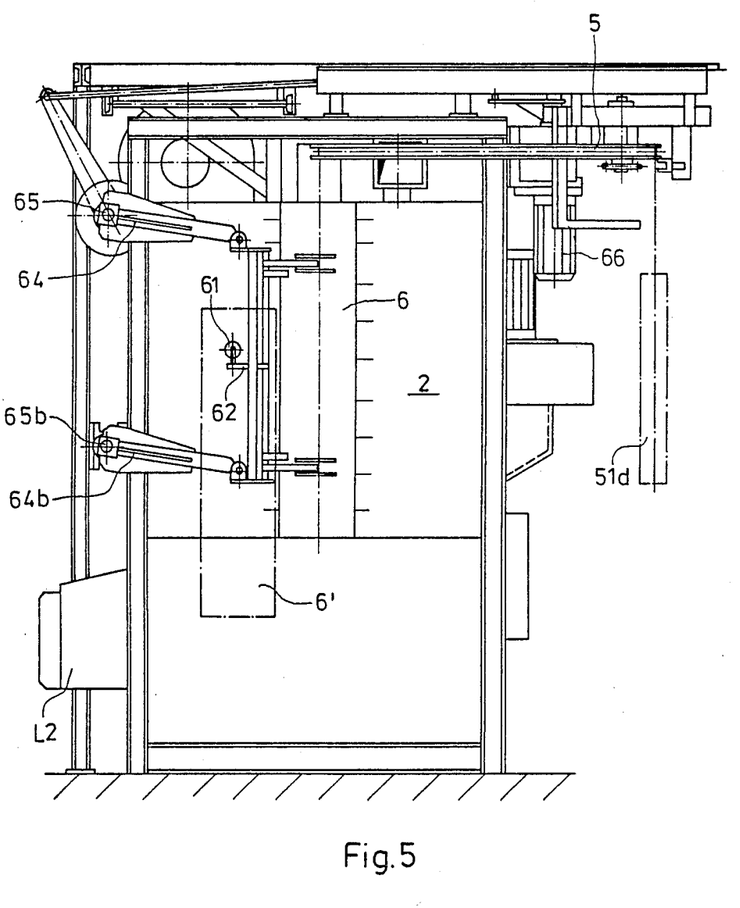
FIG. 5 is a side elevational view of the soldering or preheating oven of FIG. 4.

As can be seen in FIG. 5, respective auxiliary pivoted arms 64b are provided in addition to the pivoted arms 64 for the parallel guidance of the door 6. The door 6 is illustrated in its open position in phantom lines and is indicated by the reference numeral 6'.

Additionally, an inspection door 7 is provided at the front side of each of the ovens 2 and 3. The doors 7 remain in their closed positions during the operation of the soldering arrangement.

Figure 4:
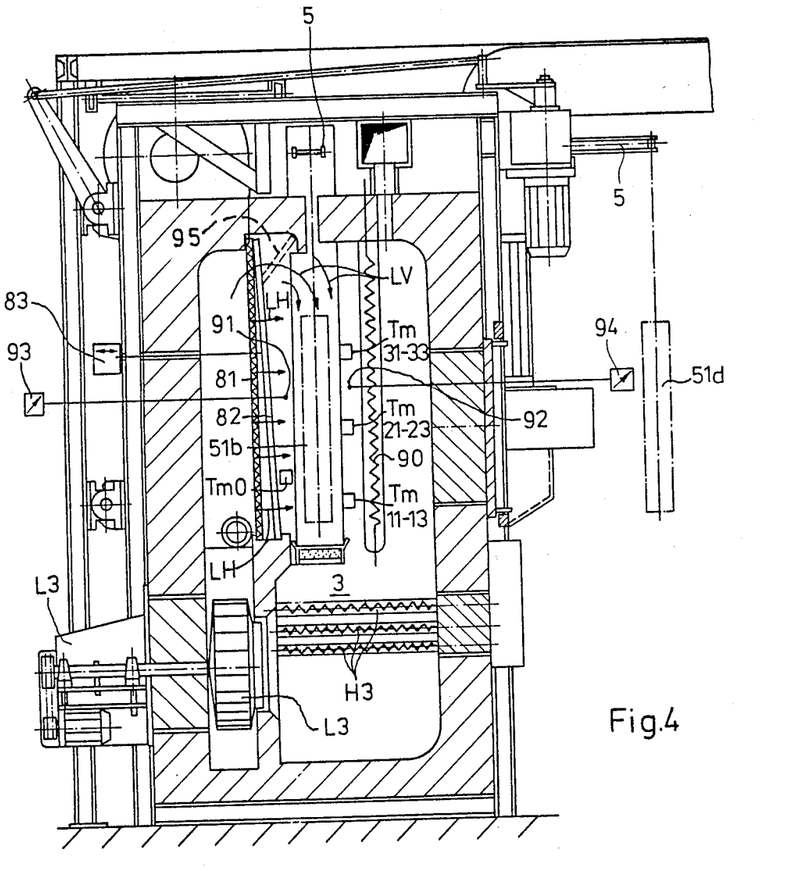
FIG. 4 is a vertical sectional view through a soldering or a preheating oven constructed in accordance with the present invention.
Figure 6:
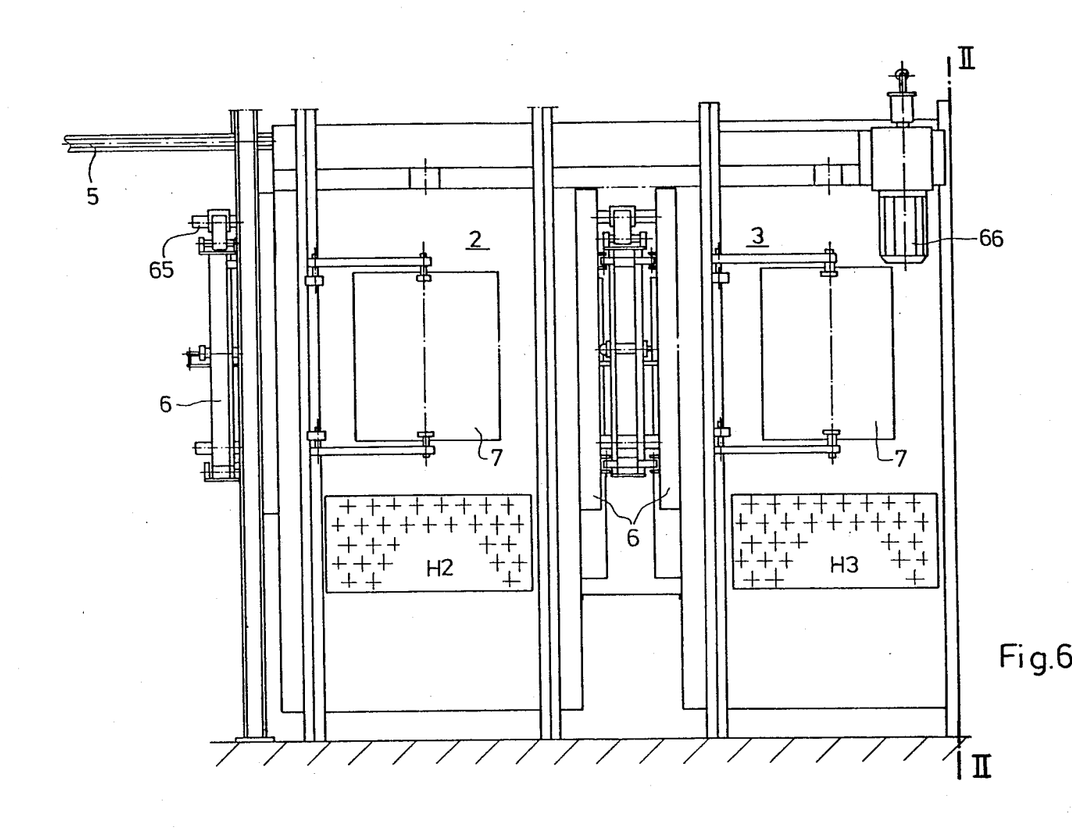
FIG. 6 is a front elevational view of a preheating oven and a soldering oven constructed in accordance with FIGS. 4 and 5.

As shown in FIGS. 4 and 6, a respective oven heating arrangement H2 or H3 is arranged in each of the ovens 2 and 3, by means of which the air contained in the respective oven 2 or 3 is heated to a predetermined temperature. A respective controllable blower L2 or L3 blows the heated air through the respective part 51a or 51b. A pair of grating elements 81 and 82 (shown in FIG. 4) which are positionally adjustable with respect to one another is arranged in front of the respective parts 51a or 51b. The grating elements 81 and 82, on the one hand, serve as a distributing arrangement which effects a good uniform turbulence in the stream of air which flows toward the respective part 51a or 51b while, on the other hand, they provide a predetermined air velocity distribution over the height of the interior of the respective oven 2 or 3 in correspondence with their mutual position. In the illustrated upwardly narrow and downwardly wide mutual position of the grating elements 81 and 82, the pressure differential, by which the desired damming effect is achieved, is so compensated that there is obtained a uniform transverse flow over the entire height of the respective part (material) 51a or 52b. The middle distance of the grating elements 81 and 82 amounts to about one diameter of a grating rod.

To the extent that different heat-exchanger or cooler types are to be soldered, in which case it may be desired to provide a longitudinal air flow, the grating elements 81 and 82 are so positionally adjusted as to be far apart at the upper region and close together at the lower region, so that the air passes substantially at the upper region and flows in an inclined path from above to below past the respective part 51a or 51b. This particular mutual position of the grating elements 81 and 82 is also preferred when only relatively short parts are to be soldered and, as a result of this, no air flow is needed in the lower part of the soldering region. The positional adjustment of the grating elements 81 and 82 with respect to one another is accomplished by means of a pivoting drive 83. In this manner, the pair of the grating elements 81 and 82 forms an adjustable throttling arrangement.

A first temperature sensor Tm0 is arranged between the grating elements 81 and 82 and the part to be soldered. This temperature sensor Tm0 provides an output signal representative of the oven temperature TF. Furthermore, additional temperature sensors Tm11 to Tm33 are arranged downstream of the part 51a or 51b as far as the flow of air is concerned. The temperature sensors Tm11 to Tm33 are horizontally and vertically distributed in a matrix, and the first and second digits in the designations of the additional temperature sensors Tm11 to Tm33 respectively indicate the positions of the additional temperature sensors Tm11 to Tm33 in the matrix in the direction from below to above and in the direction transverse thereto. The output signals of the additional temperature sensors Tm11 to Tm33 then respectively represent the discharge temperatures T11 to T33 at the regions of the temperature sensors Tm11 to Tm33, wherein the digits in the designations of the discharge temperatures T11 to T33 correspond to the digits of the corresponding temperature sensors Tm11 to Tm33. The temperatures T11 to T33 are then used, in a manner which will be more fully described later, for the determination of a discharge temperature TA. Depending on the kind of the parts or objects which are presented for the soldering operation, only a subset, for instance, a row or a column, of the measuring matrix can be occupied by temperature sensors.

The cooling chamber 4, which is depicted in particular in FIG. 8, adjoins the oven 3 in the downstream direction as considered in the advancement direction of the workpieces or parts 51a to 51e. The cooling chamber 4 is equipped with a controllable blower 71 for an initial slow cooling of a soldered part 51c below the solidification temperature of the solder, and a spraying arrangement 74 equipped with valves 76 to 79 for the quenching of the part 51c to a lower temperature with cold water and the rinsing of the part 51c with warm water, as well as a blower 72, the outlet of which is aimed in a jet nozzle fashion at the part 51c and which can be moved on a movable carriage 73 transversely of the part 51c, so that the entire surface of the part 51c is exposed during its movement past the blower 72 time and time again to the action of the jet stream emanating from the nozzle outlet of the blower 72 for the blowing-out of the unused solder and fluid. The soldering process phase which is performed in accordance with the present invention in a high-quality fashion in the soldering oven 3 is adequately brought to a conclusion by the exactly controlled cooling process and the subsequent cleaning performed in the cooling chamber 4, so that a finished product having the highest possible soldering quality is obtained at the output end of the cooling chamber 4.

The preheating and the soldering operations can be performed, as far as the process of accomplishing these tasks is concerned, in one or more ovens. The description of the process of the present invention is presented here for a total of three ovens, through which the parts being soldered advance in succession in respective phases P1, P2 and P3. If the number of the ovens is smaller or larger than three, then the corresponding phase connections are to be omitted or added.

The preheating operation for the part to be soldered is performed with such a velocity of the air flow that the parts that are pressed together in a holding arrangement do not suffer any significant displacement with respect to one another and that the solder and the fluid are retained between the parts to be soldered together. The controllable blowers L2 and L3 are respectively operated in a controlled manner, commencing from a starting speed which corresponds to a maximum air velocity v max (as shown at the top of FIG. 1) at a temperature below a lower limiting temperature Tgu, Tgu', or T2, to a minimum final speed which corresponds to a minimum air velocity v min with an increasing approach to a predetermined upper limiting temperature Tgo, Tgo', or T3. The behavior of the air velocities vL or v1, v2, or v3 of the blowers L1, L2 or L3 is such, as shown at the upper region of FIG. 1, that each of them decreases from 100% of the velocity v max at the beginning to about 10% of the velocity v max at the end. Herein, the temperature of the object to be soldered or being soldered is determined from the output temperature TA of the circulating air. After the upper limiting temperature T3, which is advantageously chosen to be several degrees, such as for instance 5° Kelvin, above the solder melting termination temperature TLe, is reached in the soldering oven, it is waited until the expiration of a predetermined post-soldering time ZN until the soldering operation, that is, the soldering phase P3, is completed and the soldered object is transferred into the cooling chamber.

Figure 2:
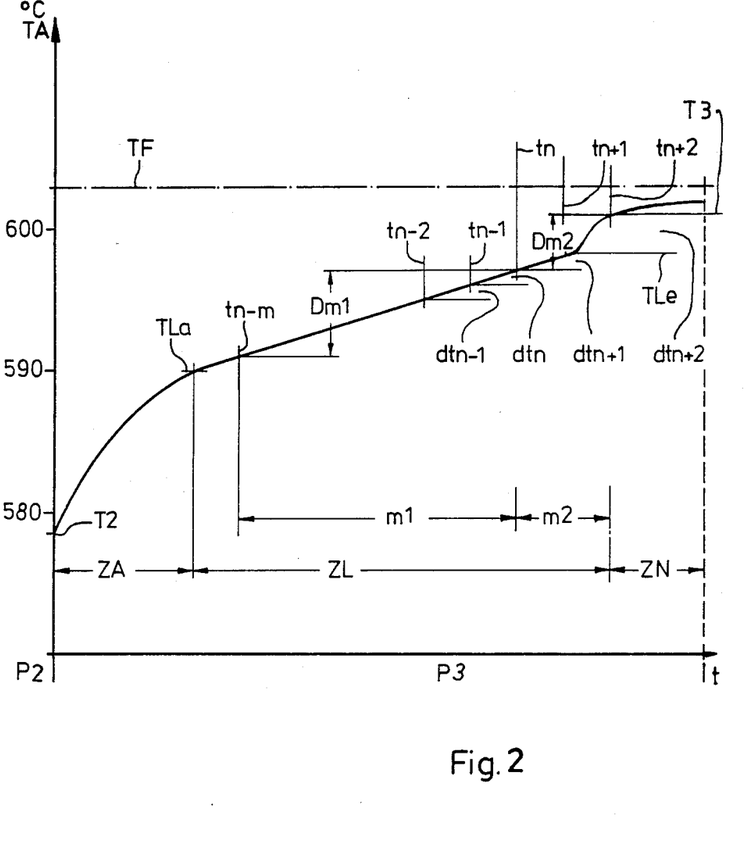
FIG. 2 is a diagrammatic representation of the characteristic behavior curve for the temperature during a soldering phase, showing additional details.

The solder melting termination temperature TLe may be known beforehand. However, this temperature TLe is advantageously directly determined from the temperature behavior of the discharged air. The details of this determination are illustrated in FIG. 2 of the drawing. During the heating period ZA, the temperature TA increases in accordance with the specific heat at a relatively rapid pace. As soon as the solder begins to melt at the solder melting commencement temperature TLa, melting heat is accepted by the solder, and this results in a slowed-up temperature increase during the soldering time ZL. When all of the solder is molten at the solder melting termination temperature TLe, the air temperature again increases, in a stepped manner, to a final air temperature value. The temperature TA is continuously measured at points in time tn−m etc. which are spaced by predetermined time intervals that are relatively short with respect to the soldering time ZL and, from the continuously determined measured value differences dtn−m, . . . dtn, dtn+1, . . . between the successive measured values, there is established by a continuous comparison of such differences the relatively rapid increase in the temperature rise slope which occurs, for example, between times of taking the measured values differences dtn+2 and dtn+3, and the solder melting termination temperature TLe, which lies at the inflection point of the curve occurring at the time point $tn+1$ is determined therefrom. From this solder melting termination temperature TLe, there are then also determined the presetting temperature for the regulation of the oven temperature TF or of the operation of the oven heating arrangement H3, as well as for the regulation of the further oven heating arrangements H1 and H2.

The accuracy of the determination is further improved when the total temperature differences Dm1 and Dm2 are respectively continuously determined over adjoining time periods m1 and m2 each of which includes several time intervals and a significant increase, for instance a doubling, of the temperature increase slope between these time periods m1 and m2 is determined, and the solder melting termination temperature TLe is established in this manner. Herein, the length of the respective earlier time period m1 is advantageously chosen to be somewhat shorter than the expected soldering time ZL, while the length of the respective later time period m2 is advantgeously chosen to correspond to two of the time intervals.

In an analogous manner, even the solder melting commencement temperature TLa is determined, in accordance with a further feature of the method according to the present invention, in such a manner that the decrease in the temperature rise slope, for instance to less than one-half of the previous value, is determined in adjoining time periods. In this case, the length of the respective later time period is advantageously chosen to be somewhat shorter than the soldering time ZL and the length of the respective earlier time period is chosen to be somewhat shorter than the expected heating time ZA. Then, the soldering time ZL is determined from the solder melting commencement temperature and the solder melting termination temperature established in the above-described manner for use as a basis for the further measuring operations during the subsequent soldering operations.

In a soldering arrangement with two or more oven sections, the phases P3, P2 and P1 are so coordinated to one another as far as their respective durations are concerned that they are fully utilized and, in this manner, there is obtained a minimum total soldering time or dwell time of an object being soldered, such as a cooler, in the soldering arrangement. The coordination is accomplished by means of stepwise adjustment of the upper limiting temperatures Tgo or Tgo', depending on whether the respective upper limiting temperature Tgo or Tgo' is reached sooner or later than required by a respective lower or upper time limit Zg1u, Zg1o, Zg2u or Zg2o, these time limits Zg1u, Zg1o, Zg2u and Zg2o being predetermined with respect to the respective phase termination time. Herein, the minimum duration of the soldering phase P3 is determined by an empirically predetermined post-soldering time ZN, the soldering time ZL and a heating time ZA over at least 10°K, which has been proven to be advantageous by experience. In this manner, there occurs automatically and in a stepwise fashion an optimization of the phase time distribution for the heating in its totality. In order to assure that no periodic temperature variations come into being between the preheating phases P1 and P2, the upper limiting temperature Tgo of the first phase P1 is always so predetermined that it is, to the extent possible, reached at the same point in time at which the upper limiting temperature Tgo' is reached during the performance of the second phase P2 of the parallel process, in that the change of the upper limiting temperature Tgo of the first phase P1 is accomplished for the following time period on the basis of the direction and the magnitude of the difference between the time points at which the upper limiting temperatures Tgo and Tgo' are reached, until the magnitude of this difference is reduced to less than an acceptable minimum value.

The calibration of the temperature sensors Tm0 and Tm11 to Tm33 with respect to one another is preferably accomplished while the oven is not loaded so that, by definition, all of the temperature sensors Tm0 and Tm11 to Tm33 sense the same temperature, and furthermore, in a second step, with respect to the solder melting termination temperature TLe which is determined in the manner which has been discussed above.

From the thus determined temperature, there is predetermined the desired temperature for the oven heating arrangements H1, H2 and H3 which, under the control of subordinate control circuits, provide a substantially constant oven temperature TF.

If the temperature sensors Tm11 to Tm33 indicate different discharge temperatures inasmuch as, for instance, only a small cooler is present in the oven, then advantageously only the lowermost indicated temperature is evaluated as being the discharge temperature TA.

Furthermore, the discharge temperature indications obtained at the individual time points are compared with one another and it is determined if there exist whole rows from above to below or from below to above which have practically no temperature decrease with respect to the oven temperature TF. If there is provided a differential signal, it is utilized to so adjust the throttling arrangement 81 and 82 in the corresponding sense that the air flow toward the rows without temperature decrease is reduced, so that there is achieved a reduction in the magnitude of this difference. In this manner, the heat transfer to the object to be soldered is improved. The adjustment to different loadings of the oven occurs automatically.

Advantageously, even the individual process steps of the cooling operation which are performed in the cooling chamber are determined on the basis of temperature monitoring. The cooling by the cold air issuing from the blower 71 occurs in accordance with a temperature behavior curve AK which, in principle, corresponds to the behavior during the soldering in reverse and which can be evaluated in a corresponding manner. The cooling is performed down to a predetermined air discharge temperature T4 by the cold air stream, whereafter the cold water spraying is activated which effects a quenching with the cold water WK to approximately 90° C. within a predetermined time period Zv2, whereafter there occur a washing WW with warm water Wa for a predetermined time period Zv3, a pickling Be with a pickling solution B for a predetermined time period Zv4, and a subsequent rinsing Sp with a rinsing agent SW in a predetermined time period Zv5. The time periods Zv2 to Zv5 are advantageously determined, as far as their respective durations are concerned, in correspondence to the time period ZK, since the time period ZK gives a measure for the size or the amount of the soldered material, to which the process steps are to be adjusted. In this manner, the energy and processing medium demands are kept as low as possible and the time consumed for the performance of the cooling phase P4 is minimized. The control of these process steps is accomplished by a sequential control of the valves 76 to 79 which, as shown in FIG. 8, are arranged ahead of the spraying arrangement 74.

Figure 3:
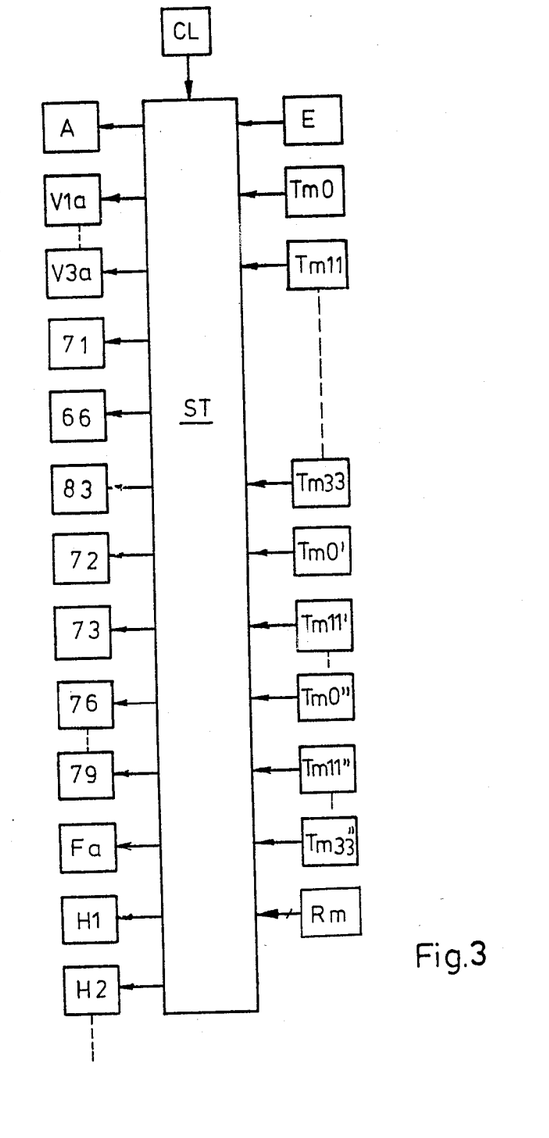
FIG. 3 is a block diagram of a control arrangement for the performance of the method of the present invention with respective input and output terminals.

FIG. 3 illustrates a control arrangement ST, which can be constituted by a program-controlled processor, wherein the connections of the respective input and output terminals are also diagrammatically represented. The operation and timing sequence is clocked by clock signals originating at a timing device CL.

An input device E serves for the input of starting values and an output device A serves for furnishing operation and alarm signals to the operating personnel.

For the processing, there are presented to the respective inputs of the control arrangement ST the signals of the temperature sensors Tm0, Tmo', Tmo", Tm11 ... Tm33" of the soldering oven 3 as well as the corresponding temperature sensor signals of the preheating ovens 1 and 2 and of the cooling chamber 4, and all feedback signals Rm of the various drives and blowers are also supplied to the corresponding inputs of the control arrangement ST. The respective outputs of the control arrangement ST are fed to the control inputs of the drives 66 and 83, the blower drives V1a, V2a, V3a and 71, the valves 76, 77, 78 and 79, the blower 72, the conveyor carriage 73, the conveyor drive Fa and the oven heating arrangements H1, H2 and H3.

During the performance of the process in accordance with the present invention, the input signals and the starting values are combined in the control arrangement ST and new starting values for the subsequent processing are stored, and the control signals are generated in the desired time sequence and fed to the respective control inputs or, as reference values, to the respective regulating devices, for instance, of the oven heating arrangements H1, H2 and H3 or for the blower operating speed adjustment.

As illustrated in FIG. 4 of the drawing, it is further preferred to associate an auxiliary heating arrangement 90 with the respective cooler 51b, the auxiliary heating arrangement 90 being arranged opposite to the grating elements 81 and 82. A respective temperature sensing element 91 and 92 is arranged at the respective side of the cooler 51b, the temperature sensing elements 91 and 92 being respectively operatively connected with associated regulating devices 93 and 94. The temperature sensing element 91 senses the convection heat arriving from the oven heating arrangement H3, while the temperature sensing element 92 senses the radiation heat arriving from the auxiliary heating arrangement 90. These two kinds of heat are controlled by the regulating devices 93 and 94.

As also shown in FIG. 4 of the drawing, the already previously mentioned distribution and throttling arrangement which preferably consists of the grating elements 81 and 82 is arranged between the blowers L1, L2 and L3 and the parts 51. The grating elements 81 and 82 are positionally adjustable with respect to one another and are arranged in substantial parallelism to one another at a predetermined distance from each other. One of the grating elements 81 and 82, as shown the grating element 82, can be pivotally displaced by a drive 83 about an axis, so that the distance between the grating elements 81 and 82 increases or decreases from above to below and, in this manner, there is obtained, on the one hand, a flow which is uniform both along the horizontal axis and along the vertical axis. The grating elements 81 and 82 are constructed in such a manner that the air flow is diverted from the horizontal flow direction LH to the vertical flow direction LV as a result of the complete closing of the grating elements 81 and 82 and simultaneous opening of an airflow control flap 95 which is arranged at the top region of the throttling arrangement.

After the closing of the grating elements 81 and 82 and the diversion of the flow from the horizontal flow direction to the vertical flow direction, heating elements which are incorporated in the grating element 81 are put in operation and also the auxiliary heating arrangement V1, V2 or V3 (90) is put in operation. In this manner, the material or part 51 to be soldered is subjected from both sides to the action of radiated heat and in the vertical direction to the action of the convection heat with uniform temperature increase and uniform heat penetration into its interior.

The convection heating circuits and the radiation heating circuits are energized and regulated separately.

The radiation resistor elements can be arranged in a staggered fashion, as a result of which there is obtained a transfer of the thermal energy which is advantageous with respect to the heating of the product.

Figure 9:
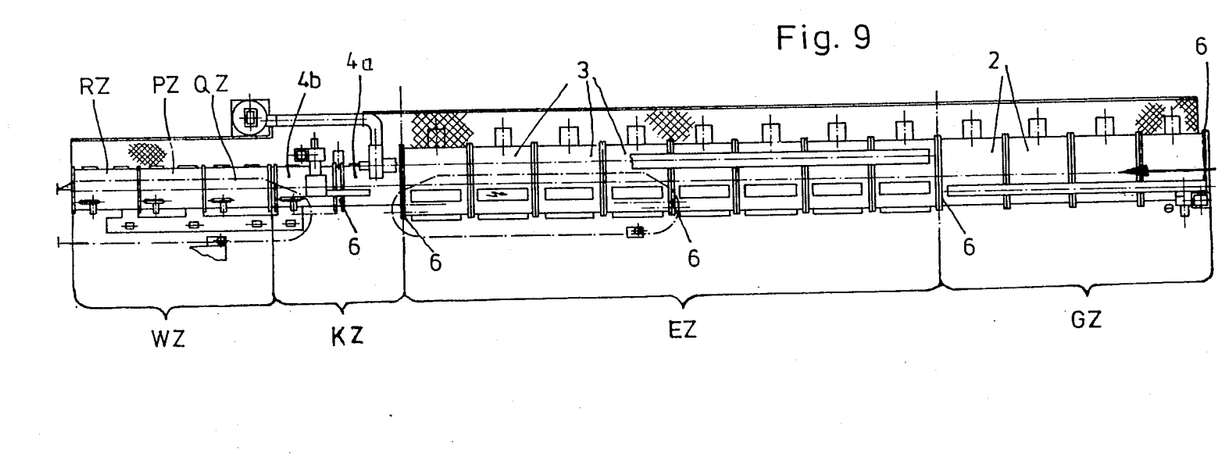
FIG. 9 is a somewhat simplified top plan view of a more elaborate continuous soldering oven embodying the present invention.

The entire continuous soldering arrangement is shown in a diagrammatic top plan view in FIG. 9. This soldering arrangement consists, in sequence as considered in the advancement direction of the material or objects 51 to be soldered, of a gas heated zone GZ, an electrically heated zone EZ, a cooling zone KZ and a washing, pickling and cooling zone WZ. The gas heated oven zone GZ consists of several oven sections 2 and the electrically heated oven zone EZ also consists of several oven sections 3.

The input end of the zone GZ is closed by a door 6, and another door 6 is arranged between the consecutively arranged heating zones GZ and EZ. Within the zone EZ, there is also provided yet another door 6, and a further door 6 is arranged between the heating zone EZ and the cooling zone KZ. Furthermore, still another door 6 extends within the cooling zone formed by the cooling chamber 4, this particular door 6 subdividing the cooling zone KZ into a compartment 4a in which the soldered part is to be cooled with air, and a quenching compartment 4b in which the soldered part is to be cooled with water. The quenching compartment 4b then merges into the washing, pickling and rinsing zone WZ, wherein RZ denotes the rinsing zone, PZ the picking zone, and QZ the quenching zone either with or without interposition of an additional door 6 therebetween.

The parts 51 to be soldered are intermittently advanced by the transport arrangement 5 through the gas heated zone GZ. Thereafter, the parts 51 are transferred into the electrically heated zone EZ where they are moved in a crawling advancement mode in order to be able to control the dwell time at the soldering temperature in dependence on the material to be soldered and independently of the treatments preceding and succeeding the soldering operation.

In the cooling zone KZ, the parts 51 are advanced at a relatively rapid pace in an intermittent fashion, and the parts 51 are again advanced in a crawling motion through the washing zone WZ.

While the invention has been described above in conjunction with certain embodiments of the apparatus for performing the method disclosed herein, it is not intended to be limited to the use or any particular configuration of such apparatus. Rather, the scope of protection is defined solely by the accompanying claims.

What is claimed is:

1. A method of soldering objects, especially aluminum objects, which are provided with respective solder layers, particularly coolers, comprising the steps of directing a flow of a heated gaseous medium in the course of a soldering operation against the objects to be soldered for the heated gaseous medium to come into intimate heat-transfer contact with the objects and thus to heat the same;

detecting the temperature of the gaseous medium discharged after its contact with the objects;

determining the upper limiting temperature, including continuously obtaining and storing the values of the temperature of the discharged gaseous medium as detected during said detecting step at predetermined time intervals, forming respective differences between successive ones of such temperature values, ascertaining an increase in the temperature slope by continuously comparing such differences, establishing the solder melting termination temperature, which is reached immediately prior to such temperature increase, on the basis of the results of said temperature difference forming step, and setting the upper limiting temperature by several degrees Kelvin about the thus established solder melting termination temperature.

2. The method as defined in claim 1, further comprising the steps of controlling the velocity of the heated gaseous medium flow directed against the objects, including maintaining such velocity at a predetermined maximum velocity value when the temperature of the discharged gaseous medium as detected during said detecting step is lower than a predetermined lower limiting temperature, gradually decreasing such velocity from the maximum velocity value to a predetermined minimum velocity value in dependence on the approach of the temperature of the discharged gaseous medium as detected during said detecting step to a predetermined upper limiting temperature, and keeping such velocity at the minimum velocity value when the temperature of the discharged gaseous medium as detected during said detecting step at least equals the upper limiting temperature; and terminating the respective soldering operation in dependence on the reaching of the upper limiting temperature by the discharged gaseous medium.

3. The method as defined in claim 2, wherein said terminating step includes commencing a predetermined time-delay period for post-soldering treatment of the objects in response to the first detection of the reaching of said upper limiting temperature during said detecting step of the respective soldering operation, and ending the respective soldering operation only after the expiration of the time-delay period.

4. The method as defined in claim 1, and further comprising the step of regulating an oven temperature for controlling a heating arrangement in dependence on the thus set upper limiting temperature.

5. The method as defined in claim 1, wherein said ascertaining step includes averaging the differences over two consecutive time periods, the duration of the later one being chosen to be sufficient for a temperature difference of several degrees Kelvin to occur during the same and to include at least two detecting points, while the earlier one has a longer duration approximately corresponding to that of the soldering time period which serves for the supply of the melting heat to the solder between a solder melting beginning temperature and the solder melting termination temperature.

6. The method according to claim 5, and further comprising the step of determining the lower limiting temperature, including ascertaining a decrease in the temperature slope during two consecutive time periods by averaging the temperature differences during each of such consecutive time periods and establishing the solder melting commencement temperature, which is reached immediately prior to such temperature slope decrease by a predetermined amount, and the time of the occurrence thereof by comparing the results obtained for the two consecutive time periods, the duration of at least the earlier one of the two consecutive time periods being somewhat shorter than the soldering time.

7. The method as defined in claim 2, wherein said directing step is performed in a plurality of consecutive phases in respective oven sections equipped with respective individually controllable heating arrangements; and further comprising the steps of performing said steps of detecting and of controlling the heated gaseous medium flow velocity separately in each of the oven sections with said lower and higher limiting temperatures increasing from each preceding to each succeeding one of the consecutive phases.

8. The method as defined in claim 6, and further comprising the step of setting the duration of a soldering phase which is the last of the consecutive phases in such a manner that it corresponds to the sum of a predetermined post-soldering time, the soldering time and a preceding heating time which is needed for achieving during the soldering phase an increase in the temperature of the discharged gaseous medium as detected during said detecting step by at least 10° K; wherein the characteristic behavior of the velocity of the heated gaseous medium during said controlling step of each of the remaining phases is selected for the respective upper limiting temperature to be reached within predetermined time limits which occur shortly before the respective phase end; and further comprising the step of adjusting said lower limiting temperature of the respective phase for use during the next succeeding performance of this phase in such a manner as to compensate for the deviation of the actual final temperature in the respective phase from the upper limiting temperature for that phase.

9. The method as defined in claim 7, wherein only two preheating and a soldering phase are provided as the consecutive phases; wherein the upper limiting temperature of the first preheating phase is so predetermined that it occurs substantially at the same time that the upper limiting temperature is reached in the second preheating phase; and further comprising the step of adjusting said lower limiting temperature of the first preheating phase for use during the next succeeding performance of this phase in such a manner as to compensate for the deviation of the actual final temperature in the first preheating phase from the upper limiting temperature for the first preheating phase.

10. The method as defined in claim 7, wherein only one preheating phase and a soldering phase are provided as the consecutive phases; wherein the lower and upper limiting temperatures of the preheating phase are so adjusted to determine the preheating time that the total time of the preheating phase and of the succeeding soldering phase is minimized.

11. The method as defined in claim 10, and further comprising the step of adjusting the value of at least one of the lower and upper limiting temperature toward the other of such limiting temperatures of the preheating phase in a stepwise manner for use of such adjusted value during the next following performance of the preheating phase, until the minimum of the total time is at least reached.

12. The method as defined in claim 1, and further comprising the steps of heating the gaseous medium in a heating arrangement prior to said directing step, measuring the oven input temperature respectively downstream of the heating arrangement and upstream of the point at which the objects are introduced, comparing the measured oven input temperature with a desired value to obtain a difference signal, and utilizing the difference signal for regulating the heating arrangement.

13. The method as defined in claim 12, and further comprising the steps of measuring the temperature in the absence of the objects at least at one location situated downstream of the point of introduction of the objects; and correlating the thus obtained measuring signal for the discharge temperature with the measured oven input temperature for calibration.

14. The method as defined in claim 2, wherein said detecting step includes detecting said discharge temperature at a plurality of locations distributed over the outline of the objects; and wherein said controlling step includes evaluating the lowest one of the thus obtained measured temperature values as the value to be used for the control.

15. The method as defined in claim 14, and further comprising the step of throttling the flow of the heated gaseous medium during said directing step by at least one spatially associated controllable throttling arrangement, and controlling the operation of the throttling arrangement in dependence on the differences between the detected output temperatures in such a sense as to reduce such differences.

16. The method as defined in claim 1, and further comprising, after the termination of the soldering operation, the steps of cooling the objects by cooling air until the temperature drops at least to a cooling limit temperature which is below the solder melting commencement temperature, and then successively quenching the objects with cold water, washing the objects with warm water, pickling the objects, and rinsing the objects for respective time periods the durations of which are predetermined with respect to the time period spent for the performance of said cooling step to the cooling limit temperature.

* * * * *